United States Patent [19]

Engel et al.

[11] Patent Number: 4,611,334
[45] Date of Patent: Sep. 9, 1986

[54] MESSAGE CAPTURING RADIO DATA SYSTEM

[75] Inventors: James R. Engel, Sleepy Hollow; Eugene J. Bruckert, Arlington Heights; Stuart W. Thro, Cary, all of Ill.

[73] Assignee: Motorola, Inc., Schaumburg, Ill.

[21] Appl. No.: 646,337

[22] Filed: Aug. 31, 1984

[51] Int. Cl.[4] .............................................. H04Q 7/00
[52] U.S. Cl. ..................................... 375/100; 455/52; 455/58; 340/825.5
[58] Field of Search .................. 455/33, 52, 56, 58, 455/166; 375/40, 100; 340/825.5, 825.77

[56] References Cited

U.S. PATENT DOCUMENTS

| | | | |
|---|---|---|---|
| 2,985,755 | 5/1961 | Giesselman | 307/259 |
| 3,155,909 | 11/1964 | Shepherd | 455/56 |
| 3,328,698 | 6/1967 | Shreder | 455/135 |
| 3,761,822 | 9/1973 | Richardson et al. | 455/135 |
| 3,906,166 | 9/1975 | Cooper et al. | 179/2 EB |
| 3,913,017 | 10/1975 | Imaseki | 455/54 |
| 3,924,190 | 12/1975 | Roach | 455/231 |
| 3,962,553 | 6/1976 | Linder et al. | 179/41 A |
| 4,012,597 | 3/1977 | Lynk, Jr. et al. | 179/2 E |
| 4,056,779 | 11/1977 | Toler | 455/11 |
| 4,056,780 | 11/1977 | Faulkner | 455/9 |
| 4,092,600 | 5/1978 | Zimmermann et al. | 455/89 |
| 4,317,218 | 2/1982 | Perry | 455/54 |
| 4,344,179 | 10/1982 | Ryan | 375/110 |
| 4,354,252 | 10/1982 | Lamb et al. | 455/11 |
| 4,419,766 | 12/1983 | Goeken et al. | 455/56 |
| 4,430,753 | 2/1984 | Shiratani | 455/166 |
| 4,527,284 | 7/1985 | Röttger | 455/56 |

OTHER PUBLICATIONS

Electronic Engineer's Handbook, First Edition; 1975; Section 21-63; p. 21-55.

Primary Examiner—Robert L. Griffin
Assistant Examiner—Raymond C. Glenny
Attorney, Agent, or Firm—Raymond A. Jenski; Rolland R. Hackbart

[57] ABSTRACT

A radio data communications system is disclosed in which messages, normally lost to interference caused by independent remote units contending for the radio channel, may be salvaged. If a remote unit communicating a message to a fixed site is interrupted by a second remote unit having a stronger radio signal, the fixed site detects the increase of radio signal strength and activates a synchronization detector which responds to a synchronization data bit sequence which precedes each data message. If the synchronization sequence is detected, the remainder of the first remote data unit message is discarded and the message of the second remote data unit is processed.

44 Claims, 13 Drawing Figures

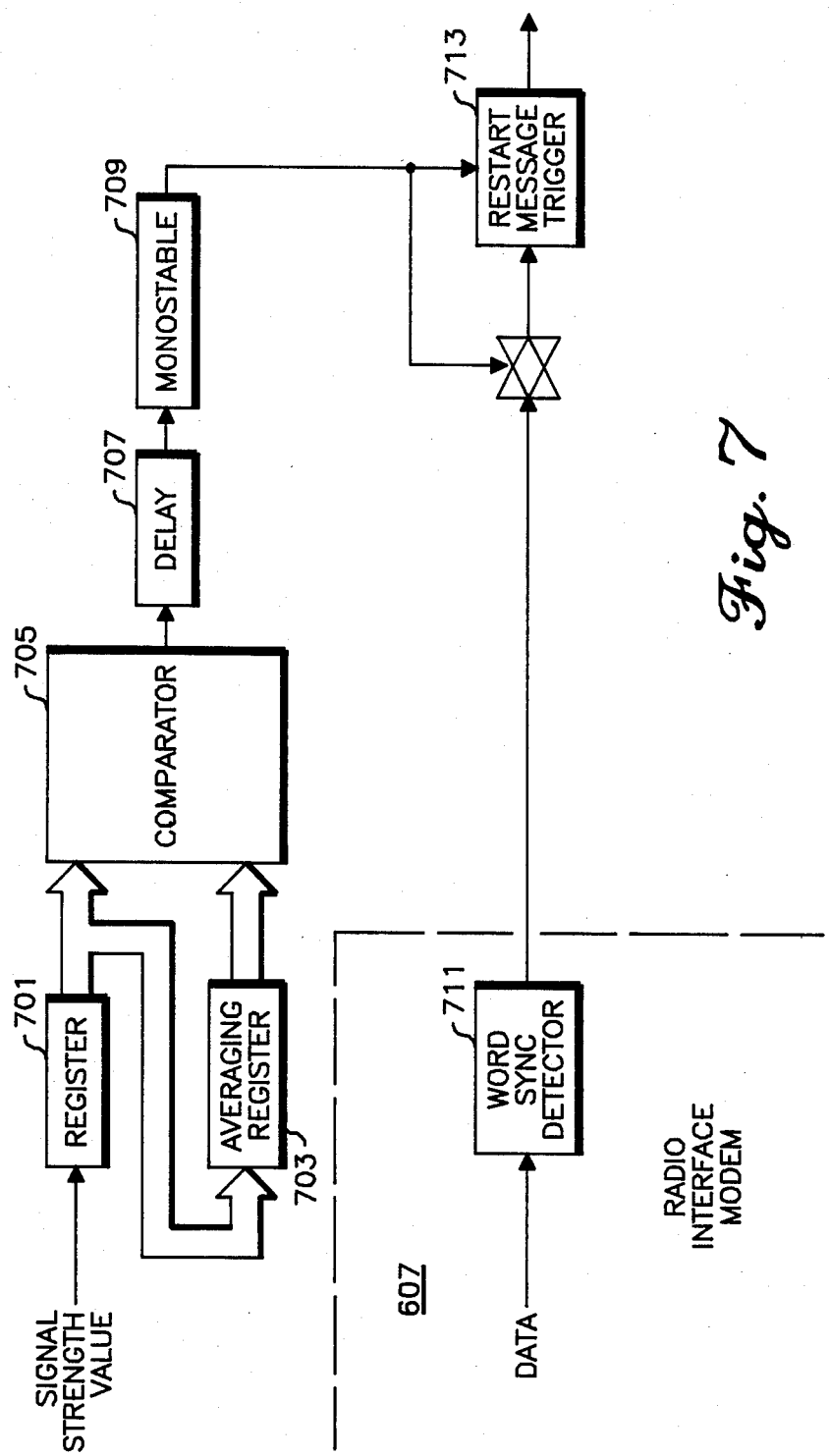

MESSAGE CAPTURING RADIO DATA SYSTEM

BACKGROUND OF THE INVENTION

The present invention generally relates to radio communications systems and more particularly pertains to a radio communications system carrying data messages between remote data terminal units and fixed stations. In many radio data communications systems, messages are generated at random without coordination between remote data units. This type of system is similar to the conventional two-way radio voice communication in extensive use in the domestic land mobile service and which results in the lowest cost service available to its users. However, the lack of coordination between remote data units occasionally results in two data units attempting to transmit a message at approximately the same time thereby contending for a radio channel.

Radio channel contention is well known to those skilled in the art. Solution of this problem has taken the form of randomizing transmissions and checking for channel activity before transmissions. These solutions, however, can add delay which reduces the number of data messages which can be carried by the channel.

Receiver selection techniques, which enable one radio receiver having a better signal than others receiving on the channel to be chosen to receive a message, consider a problem similar to that solved by the present invention. A receiver is generally selected on the basis of a signal-to-noise comparison or a tone identification and this selection is accomplished by a central controlling function. Receiver selection, however, does not necessarily help to resolve an essentially simultaneous transmission by two radios.

Controlled systems, such as a cellular radio telephone system or a trunked dispatch system (further described in U.S. Pat. NO. 4,012,597 assigned to the assignee of the present invention), utilize a channel assignment technique in which a remote unit must request permission to transmit a message. Unless this permission is given, the remote unit may not transmit its message and channel contention is limited to the requesting channel where requests are short and may be repeated. In a system where the data messages are short and of a burst nature, the set-up time of these controlled systems is typically longer than the message and therefore wastes channel time. Also, these systems may add complexity and expense to what is desired to be a low cost system.

The majority of radio channels dedicated to land mobile communications service in the United States employ frequency modulation (FM) as the method of modulating the radio carrier with message information. One fundamental advantage of FM radio transmission is the capture effect, which is a quality inherent in an FM receiver to enhance a stronger signal and diminish a weaker signal when both are present on the same channel. Thus one signal which is slightly stronger than a second signal on the same channel will be heard clearly and the second signal may not be heard at all.

The reception at a fixed station of one signal in the presence of weaker interfering signals is fundamental to the efficient and economic operation of radio data communication systems. The long term practicality of large area single channel systems as competitive generic products is in fact dependent upon the successful reception of strong signals in the presence of weaker but still decodable signals.

Contention among remote data unit transmissions on the radio channel can result in an excessive number of lost messages. The possibility of channel contention collision among remote data units transmitting "quasi-simultaneously" makes it desirable to attempt to salvage the stronger of two interfering signals.

When a weaker signal begins during the reception of a stronger signal, the fixed station takes no special action. But when a strong signal begins during the transmission of a message via a weaker signal, the fixed station controller must detect this and begin processing the new signal since it will capture and obliterate the original.

In order to deliniate the beginning of a data message, each message in a typical data system begins with a specific synchronization bit sequence. The radio channel is continuously monitored for a sequence that is nearly identical to the synchronization pattern and the data which is subsequently received is framed by this sync pattern. However, on the order of one in one thousand messages will, by random chance, contain a sequence that matches the sync sequence closely enough to spuriously indicate the beginning of a new message. Because of this, sync sequences that occur within a message are normally ignored, since the message would otherwise be inherently undeliverable, in that the original and all repeat transmissions would be aborted when the false sync sequence was reached.

Thus the quandary exists when a sync sequence occurs during a message reception: should the message continue to be decoded or should a new message be framed and decoding commenced. The consequence of a wrong decision is an unnecessarily lost data message.

SUMMARY OF THE INVENTION

It is therefore an object of the present invention to decide if a new message has begun when a change in radio signal strength and a synchronization sequence are detected in the middle of a message.

It is a further object of the present invention to resynchronize the data following a new message decision and to discard any old message data.

These and other objects are achieved in the present invention of a radio data communication system in which a remote unit communicating a data message with a fixed site may have its message interrupted by a second remote unit with a stronger radio signal. The system detects a signal strength increase associated with the second remote unit and enables a synchronization detector to attempt to synchronize to the predetermined sequence of data bits which preceed each message. If the synchronization is detected, the processing of the first remote unit data message is terminated in favor of the data message of the second remote unit.

BRIEF DESCRIPTION OF THE DRAWINGS

FIG. 7 is a functional block diagram of the elements used to achieve message capture.

DETAILED DESCRIPTION OF THE PREFERRED EMBODIMENT

A system benefiting from the present invention is one which generally conveys communications between a fixed station or stations and remote units which are free to roam about in a radio coverage area defined by the range to which the fixed transmitter may be received by the remote units and the range which the transmitter of the remote units may be received by the fixed station. The radio coverage area of a number of fixed stations may be coordinated and linked together such that large geographic areas may be covered. Additionally, more than one radio channel may be provided in each coverage area, making communications available to a large number of remote unit users. Although described hereinafter in the context of a data only communications system, both data signals and analog signals such as voice may be communicated between the fixed station and remote stations.

Figure 1:
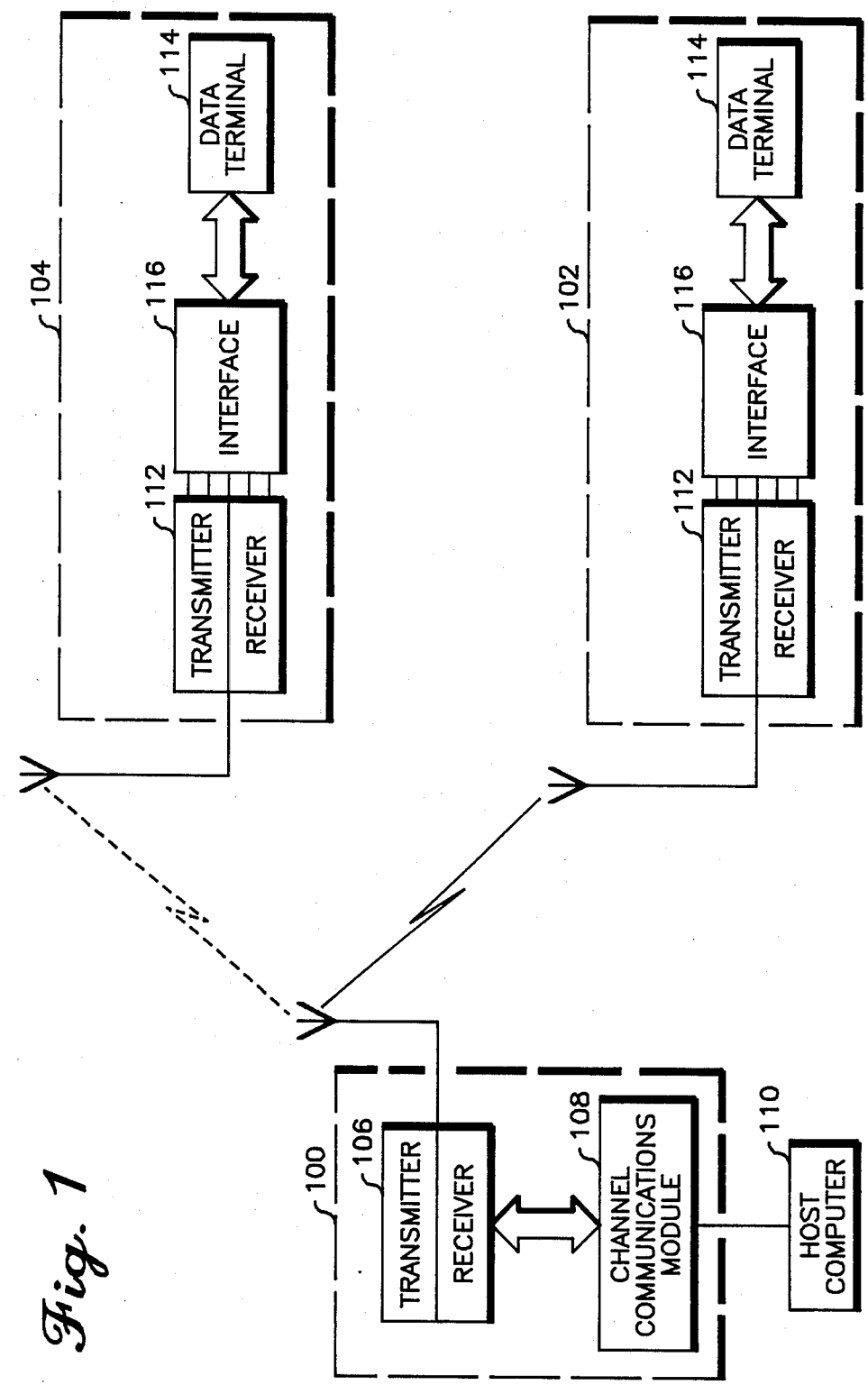
FIG. 1 illustrates a simplified radio data transmission system block diagram which employs the present invention.

Referring to FIG. 1, which illustrates a simplified system configuration, a single fixed station 100 and two remote stations 102, 104, are shown. A single radio channel, which may utilize one radio frequency or more commonly a pair of radio frequencies to transmit to the remote units and to receive transmissions from the remote units, is employed in this example although multiple channels may be, and regularly are, installed in commercial systems. A transmitter/receiver comprises part of the fixed station 100 and is shown as 106. This transmitter and receiver may be any suitable commercially available radio such as those described in Motorola Instruction Manual 68P81013E65. The transmitter/receiver 106 is preferably under the control of a channel communications module 108. In addition to the control of the transmitter/receiver 106, the channel communications module 108 also encodes and decodes the data messages which are transmitted and received on the radio channel and provides a serial communications interface to a system host computer 110. A number of channel communication modules 108 may be coupled to host computer 110 and the radio coverage areas of each fixed station 100 may thus be coordinated by host computer 110. This host computer 110 may be any variety of computer which is capable of supporting data messages between a number of remote units and of coordinating the radio coverage areas. One such host computer is an NCP2000 network communications processor marketed by Motorola, Inc.

The remote units 102 and 104 may be commercially available mobile radios of the type shown and described in Motorola Instruction Manual 68P81039E25 or commercially available hand-held portable radios of the type shown and described in Motorola Instruction Manual 68P81035C35-A, in U.S. Pat. Nos. 3,906,166 and 3,962,553, each assigned to the assignee of the present invention, and in U.S. patent application Ser. No. 187,304, "Microprocessor Controlled Radiotelephone Transceiver" filed on behalf of Puhl et al. on Sept. 15, 1980 and assigned to the assignee of the present invention. Each remote unit can be considered as three parts: a transmitter/receiver part 112, which may be any suitable commercially available conventional transmitter and receiver such as, for example, those described in Motorola Instruction Manual Nos. 68P81039E25 and 68P81014C65 (These and the other Motorola Instruction Manuals referenced are available from the Service Publications Department of Motorola, Inc., 1301 East Algonquin Road, Schaumburg, Ill. or from Motorola C&E Parts, 1313 East Algonquin Road, Schaumburg, Ill.), a data terminal part 114, which may be integral to the remote unit or an appended computing device such as that described in U.S. Pat. No. 4,354,252 assigned to the assignee of the present invention, and an interface part 116 which mediates the interaction between the transmitter/receiver 112 and the data terminal 114. Thus it is generally the intent of the described communications system to carry messages between the host computer 110 and the data terminals 114 via a radio channel.

Figure 2:
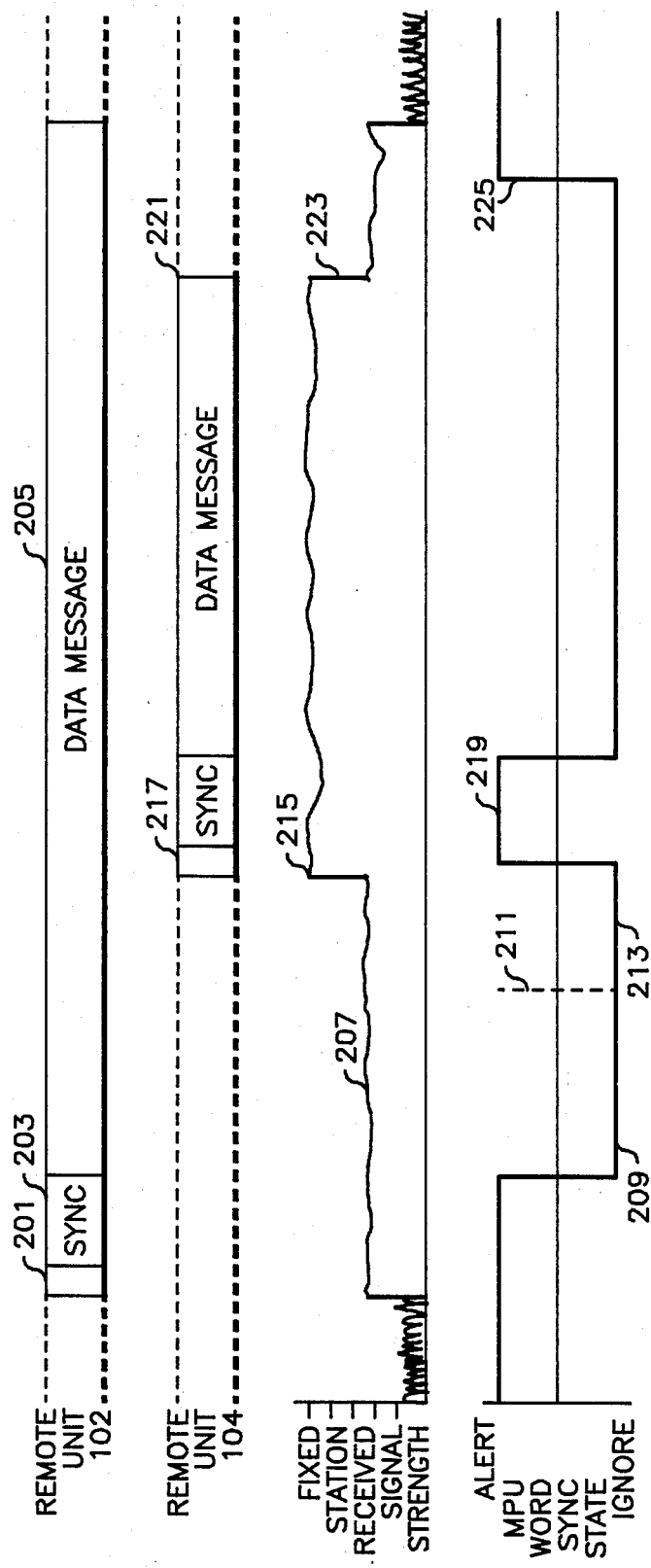
FIG. 2 is a timing diagram of the process of message capture employed in the present invention.

It is assumed in FIG. 1 that a data message is in progress between remote unit 102 and fixed station 100. Referring to the timing diagrams of FIG. 2 showing a hypothetical contention for a radio channel between two remote units, it can be seen that remote unit 102 has keyed its transmitter at 201, transmitted a synchronization sequence of data bits at 203, and has begun transmitting the data message at 205. The synchronization 203 and data message 205 are received by the receiver of fixed station transmitter/receiver 106 and the strength of the radio signal received is monitored by the channel communications module 108. The amplitude of the received signal strength of remote unit 102 is shown graphically versus time as 207. The status of a word synchronization decoder internal to the channel communications controller 108 remains active until synchronization to the specific message synchronization sequence mentioned hertofore is established at which time the detector is deactivated at 209. This word synchronization detector will be described more fully hereinafter but it is sufficient at this point to understand the detector to be a word synchronization bit sequence comparator and an interruptable microprocessor which considers message synchronization either when no data is being processed (no remote unit transmitting a message) or upon interrupt. The state of the microprocessor attention to message synchronization is depicted as "alert" when the microprocessor is engaged in a message synchronization subroutine and "ignore" when the microprocessor is attending other tasks.

The microprocessor begins to process the data transmitted by the remote unit 102 and may find in the processing of the first 112 data message bits that the message is not properly addressed (i.e., the remote unit is excluded from the system). In this instance the microprocessor would return to the message synchronization alert state, at 211. However, in the present example the remote unit is acceptable and the message processing may continue, at 213.

While remote unit 102 is in the middle of its data message transmission in this hypothesis, remote unit 104 begins transmission of a data message. Since remote unit 104 has better radio propagation characteristics to the fixed station 100, the strength of the received signal is substantially greater than that of remote unit 102. This situation results in the capture of the fixed station receiver 106 by remote unit 104 as described previously. In conventional systems this capturing would result in the data message of unit 102 being obliterated and the data message of unit 104 being lost because synchronization would not be detected and a decoder would not be activated to the data message of unit 104.

In the system of the present invention, however, the signal strength increase, shown at 215 due to remote unit 104 transmission, shown starting at 217, is detected and used to reactivate the microprocessor message synchronization state at 219 so that the data message of unit 104 may be salvaged and decoded under these conditions. It is possible that a message with an imbedded 40 bit sequence close enough to the message synchronization sequence will experience an increase of radio signal strength at an appropriate time to trigger the data capture of the present invention. This possibility, however, is a function of the product of the probabilities of the imbedded 40 bit synchronization and the sufficient signal strength increase at the imbedded synchronization occurrance. Needless to say this is a very remote possibility.

The data transmission duration of remote unit 104 may be shorter at 221 than that of remote unit 102 and the signal of remote unit 102 would reappear at the fixed station (see 223) when remote unit 104 ceased transmitting. After an appropriate time following the end of the transmission of remote unit 104, the microprocessor message synchronization state would reset at 225 to an active state but would not respond to the transmission of the remote unit 102 unless an imbedded message synchronization were detected.

Figure 3:
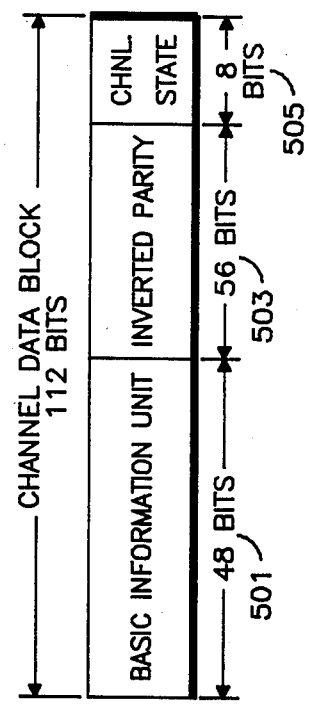
FIG. 3 is a diagram of the transmitted data format.

The basic data format used in the preferred embodiment is shown in FIG. 3. Although this embodiment employs a digital frequency modulation at 4800 bits per second, any data speed which is consistent with channel bandwidth may be employed. Each message begins with a preamble 301 which consists of a bit synchronization field 303 and a message synchronization 305. The bit synchronization field 303 is a predetermined pattern of at least 20 data bits of alternating 1's and 0's, ending in a 0. The number of bits is determined by radio transmitter and receiver response times. The message synchronization field 305 consists of a pattern of 40 bits that mark the beginning of a message 307. The preferred bit sequence of the message synchronization field 305 is shown as 309. Detection of the message synchronization bits indicates that an encoded data block follows immediately. Detection is accomplished by continuously comparing the last 40 received bits with a stored fixed synchronizing code word. When a predetermined number (35 in the preferred embodiment) of the 40 bits match the synchronization code word bits, synchronization is considered established.

Figure 4:
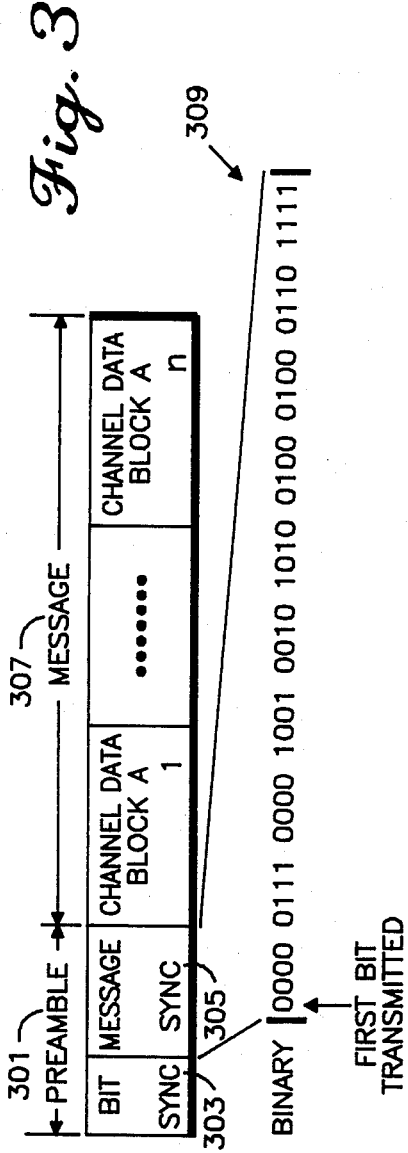
FIG. 4 is a diagram of the control information data block to be used in the format of FIG. 3.

The message 307 consists of a number of channel data blocks shown as channel data block 1 through data block n in FIG. 3. The first two channel data blocks and the last channel data block may be subdivided as shown in FIG. 4. The 32 information bits 401 are encoded by first generating a 48 bit word 403 consisting of the 32 information bits and a 16 bit cyclical redundancy check code appended to the 32 information bits. This 48 bit code word 403 is further encoded using a half rate convolutional encoder thereby producing a 112 bit coded channel data block 405. Channel data blocks 1, 2 and n carry system overhead information such as length of the data message.

Figure 5:
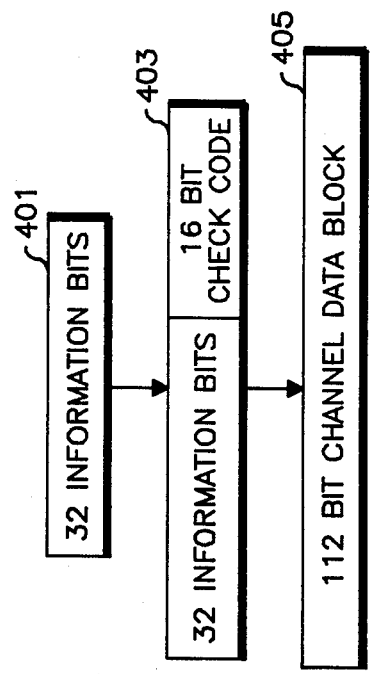
FIG. 5 is a diagram of the message data block to be used in the format of FIG. 3.

The remainder of the channel data blocks in the message are the fundamental envelopes for all information that is to be transmitted by the system. A channel data block can be segmented into three component fields as shown in FIG. 5. These fields are: a 48 bit basic information unit field 501, which carries the actual user information; a 56 bit parity field 503, which is the result of the operation of a rate $\frac{1}{2}$, K=7 convolutional encoding algorithm on the 48 bits of the basic information unit 501; and an 8 bit channel state field 505, 7 bits of which are used to indicate the busy state of the inbound channel (inbound with respect to the fixed station) to remote units that have potential inbound traffic. Additional details regarding the data transmission protocol may be found in U.S. patent application Ser. No. 402,682, "Data Signalling System" filed on behalf of Burke et al. on July 28, 1982 and in U.S. patent application Ser. No. 512,800, "Method and Apparatus for Coding Messages Communicated Between a Primary Station and Remote Stations of a Data Communications System" filed on behalf of Freeburg et al. on July 11, 1983, both of which are assigned to the assignee of the present invention.

Figure 6:
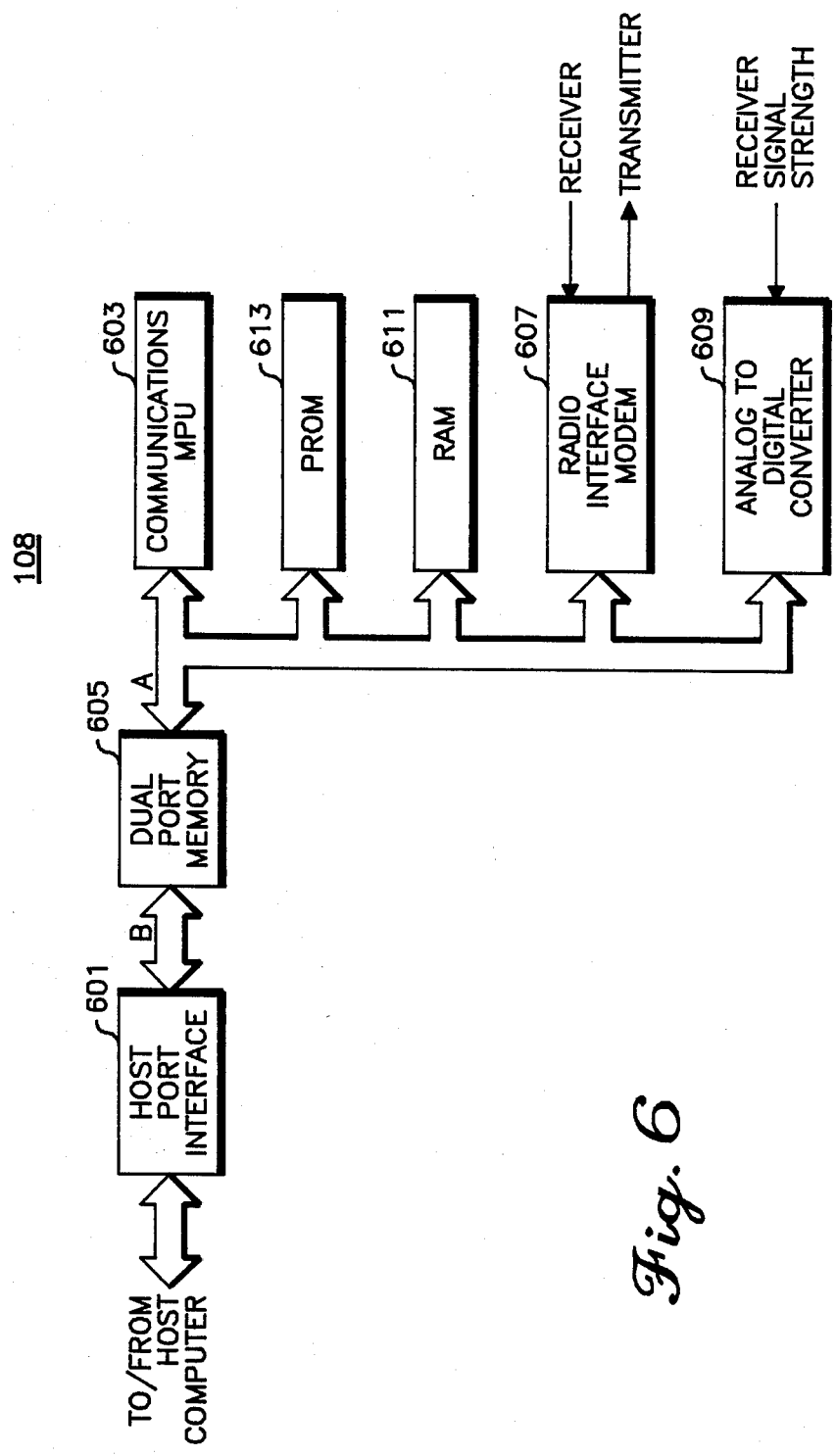
FIG. 6 is a block diagram of a fixed site channel control module employing the present invention.

The composition of the channel communications module 108 is shown in the block diagram of FIG. 6. A host port interface 601 connects to the host computer 110 via standard communication data links. The host port interface 601 converts the parallel data of the channel communications module 108 to a serial data stream for the communications link to the host computer and vise versa. It also inserts protocol bits into the outbound data stream, strips such bits from the inbound data stream, generates and validates cyclic redundancy checks and sends idle characters continuously when no data is present. The host port interface 601 includes a supervisor microprocessor such as an M6803 microprocessor available from Motorola, Inc. and associated external memory.

The host port interface 601 is connected to the communications microprocessor 603 via a dual port memory 605. The dual port memory device provides parallel data communications between the supervisor microprocessor of the host port interface 601 and the communications microprocessor 603. Dual port memory 605 includes 248 bytes of dual-port RAM, 6 semiphore registers, and 2 interrupt registers for a total of 256 bytes addressable from either microprocessor. The communications microprocessor 603 connects to the "A" side of the dual port memory 605 which uses time multiplexed address and data. The host port interface supervisor microprocessor connects to the "B" side via separate address and data ports. This dual port device enables the 2 microprocessors, whose clocks are not synchronized, to exchange data at their own individual rates.

The communications microprocessor 603 has as its main tasks the maintenance of the radio channel interface and the message synchronization detection described heretofore. These tasks are accomplished via a radio interface modem 607 and an analog to digital (A/D) converter 609 with instructions stored in random access memory (RAM) 611 and site identification and personality stored in a fusable link programmable read only memory (PROM) 613. The radio interface modem 607 provides a full duplex, synchronous data interface between the communications microprocessor 603 and the fixed transmitter/receivers. The radio interface modem 607 also contains logic for bus interface and control, data recovery, and clock recovery. It also includes an internal counter which cooperates with the A/D converter 609 in conventional manner to generate an 8 bit data byte which represents the RF signal strength received by the receiver. In the preferred embodiment a custom integrated circuit combines the functions of radio interface modem 607 and A/D converter 609 into one chip. Further description of a signal strength detector useful in systems employing the present invention may be found in U.S. patent application Ser. No. 627,270, "Self Calibrating Signal Strength Detector" filed on behalf of Thro on July 2, 1984 and assigned to the assignee of the present invention.

A functional equivalent of the realization of the present invention is shown in FIG. 7. A digital representation of the received signal strength is coupled from the analog to digital converter 609 to an 8 bit register 701 and to an averaging 8-bit register 703 which maintains a running average of the signal strength from the beginning of the message. Other methods of maintaining a representation of the signal strength amplitude may be employed without affecting the intent and scope of the present invention. For example a measurement of peak signal strength from a set of samples may be taken rather than an average signal strength level. Alternately, comparison of the current signal strength level to the last signal strength level may be used. In the preferred embodiment employing averaging, the outputs of register 701 and register 703 are clocked to a comparator 705 where an algebraic determination of the difference of the signal strength value stored in register 701 and the signal strength value stored in the averaging register 703 is made. An output pulse is coupled to a pulse delay function 707 if the value of the signal strength difference is greater than a predetermined amount. In the preferred embodiment this difference value has been selected to be 9 dB, however it may be adjusted by changing selected program constants stored in PROM 613. The delay 707 is introduced in the comparator 705 output pulse to allow time for bit synchronization to the incoming signal. This time may be in the order of 8.33 milliseconds from the time of the comparator output pulse. The delayed pulse is then coupled to monostable 709 which provides a window timing pulse for a duration which may be 10 milliseconds during which time the output of the radio interface modem 607 word synchronization detector 7 is passed to a restart message trigger 713 which triggers a communications microprocessor 603 interrupt and allows further processing of the new data in the system. In addition to the value of required signal strength difference for comparator 705 stored in PROM 613, the duration of the window open value of monostable 709 and delay value for delay 707 are also dependent upon values stored in PROM 613.

Figure 8A:
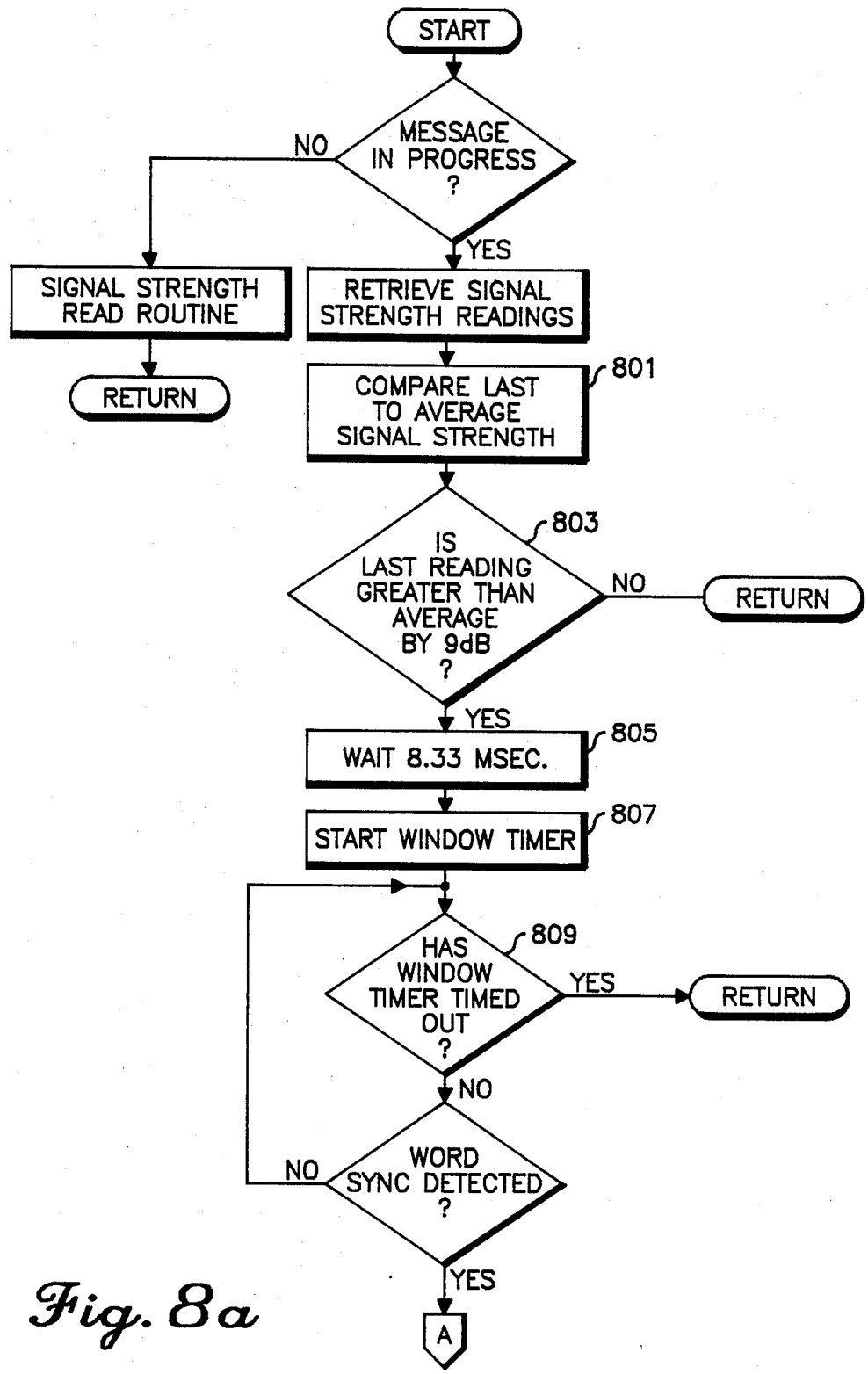
FIGS. 8a and 8b comprise a flowchart of the message capture method.
Figure 8B:
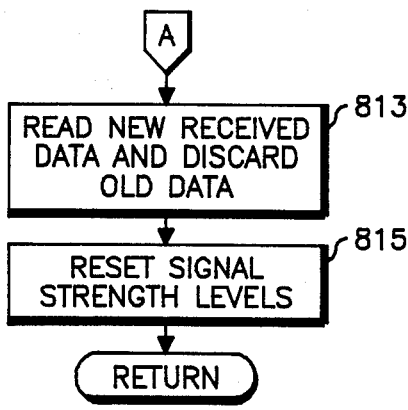

The system of the preferred embodiment employs a computer program run in conventional fashion by the communication microprocessor 603 to perform the unique functions (except for message synchronization bit comparison) outlined in FIG. 7. The subroutine performing these functions is flowcharted in FIG. 8. In this subroutine the last signal strength reading is compared to the average signal strength reading at 801 and a comparison of the difference between the two signal strengths is compared at 803 to a value equivalent to 9 dB read from PROM 613. If this difference is not greater than 9 dB the subroutine returns to the main operating program, however if it is greater than 9 dB, a system wait of 8.33 milleseconds at 805 is performed before the window timer at 807 is started. During the window time which lasts 10 milliseconds in the preferred embodiment, a detection of message synchronization is awaited. If message synchronization is not detected during this window, the window timer times out at 809 and the subroutine returns to the main operating program. If message synchronization is detected during the window period, a new received data read occurs at 813, which results in any remaining old data being ignored and new data transmitted by the capturing remote unit being received by the system and processed. Additionally, the signal strength average register is reset at 815 for the new remote unit before the program returns to the main operating program.

Figure 9:
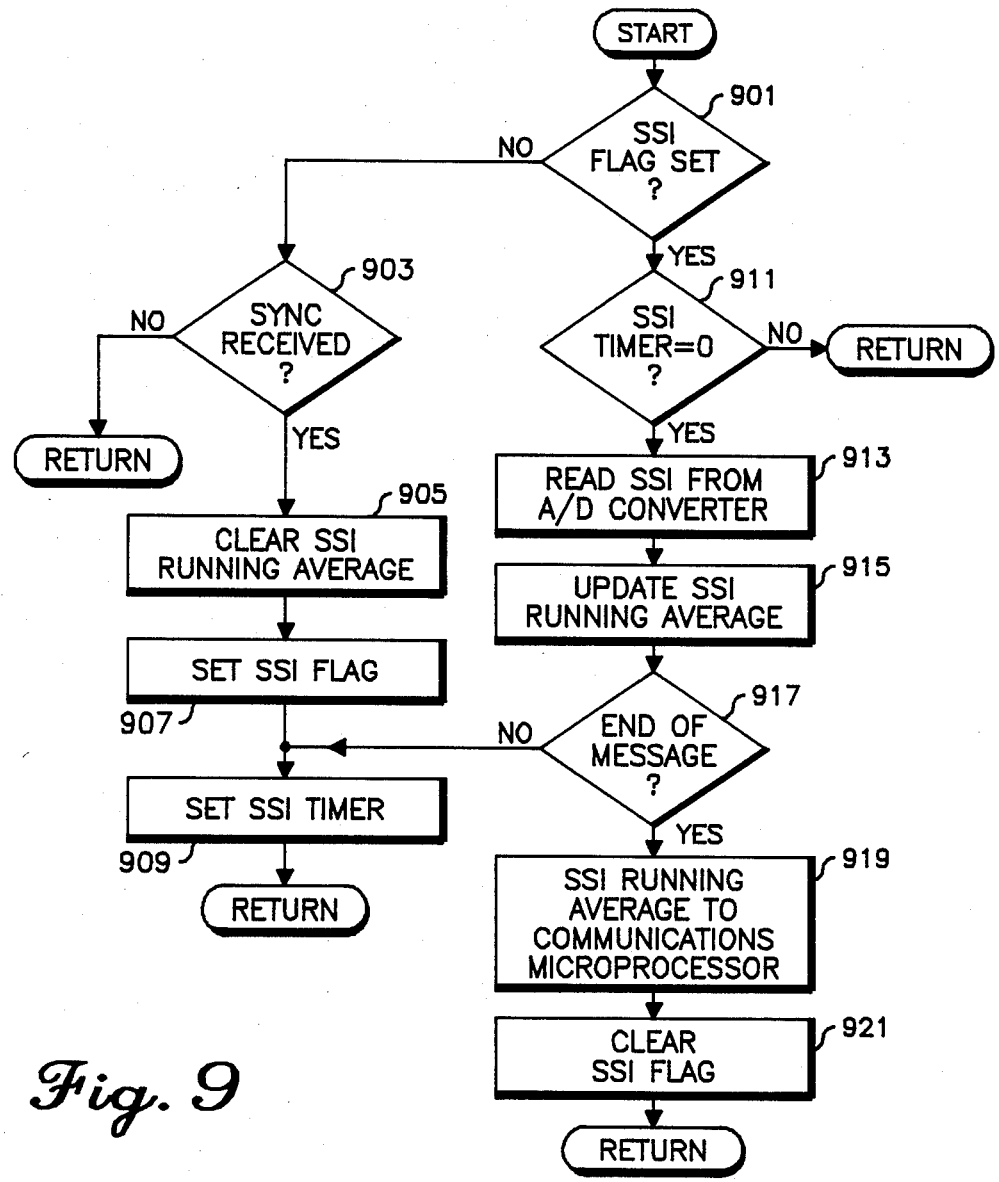
FIG. 9 is a flowchart of the signal strength indication method.

The subroutine employed by communications microprocessor 603 to determine the signal strength of the received remote unit is shown in FIG. 9. At the beginning of this subroutine, which is called each time a data block is received, a check is made to see if a signal strength indication (SSI) flag has been set to trigger the reading of a signal strength value. If the SSI flag is not set, the "NO" branch is taken at 901 to decision block 903 where it is determined whether or not message synchronization has been detected. Signal strength measurements need not be taken until message synchronization is detected and, once this occurs, several signal strength measurements may be taken at different times during the message so that an average signal strength can be developed. If a message synchronization has been received without an SSI flag being set, the existing running average is cleared at 905 and the signal strength indicator flag is set at 907. The signal strength indication timer at 909 is set in the preferred embodiment to time for 12 milliseconds so that a plurality of signal strength measurements will be taken during each data message.

Returning to decision block 901 and assuming the SSI flag was previously set, the YES branch of decision 901 leads the subroutine to decision block 911 where it is determined if the SSI timer has been decremented to zero. If the SSI timer is not equal to zero, the NO branch is taken to return to the main program because 12 milliseconds have not elapsed since the last sample. Otherwise the digitized signal strength indication signal is read at 913 from A/D converter 609 of FIG. 6. Next at block 915 the newly read digitized SSI signal is averaged in the averaging register with the previous SSI running average. If the end of the message is not detected at decision block 917 the SSI timer is reset for taking another signal strength measurement. If the message has ended the signal strength running average is sent to the communications microprocessor 603 for reference in future messages at 919. The signal strength indicator flag is then cleared at 921 before returning to the main operating program.

Figure 10A:
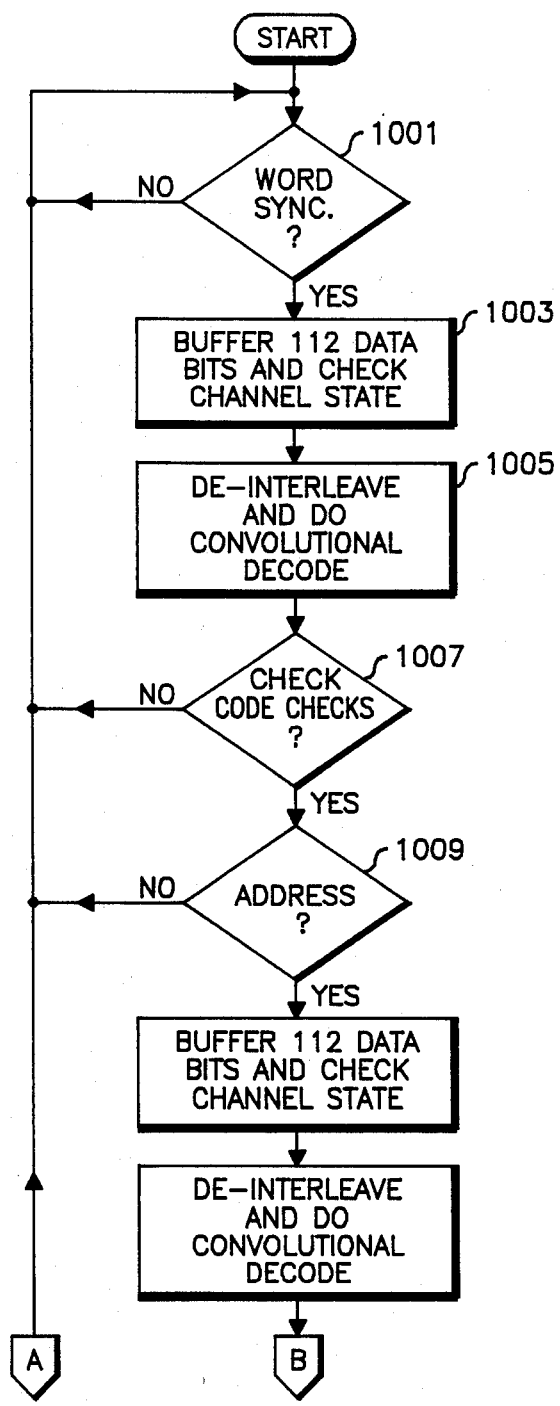
FIGS. 10a and 10b together comprise the data detection/decoding method.
Figure 10B:
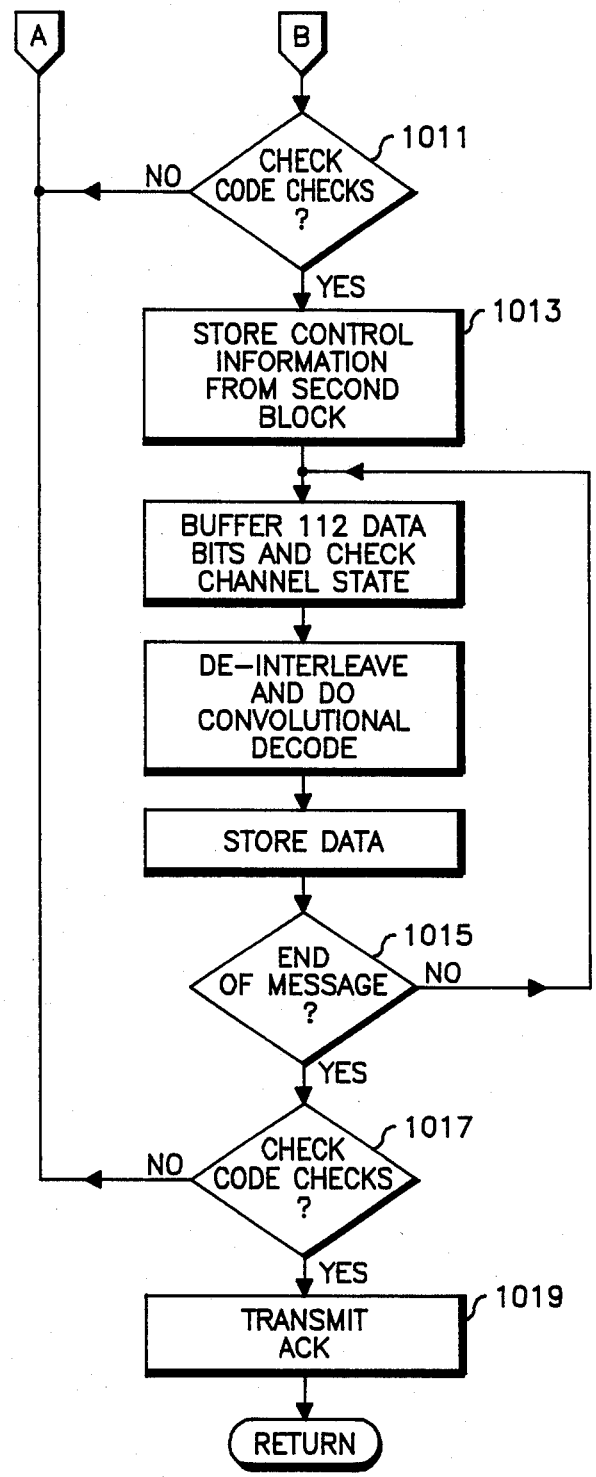

Referring to FIGS. 10a and 10b taken together there is illustrated a flowchart used by the channel communications module 108 for processing messages from a remote unit. (A similar subroutine may be used by the remote units for processing received messages). This flowchart provides a detailed description of the subroutine process steps for enabling the microprocessors, including communications microprocessor 603 and a microprocessor employed at the remote unit, to decode and store commands and messages for coupling to the host computer 110 and to the remote unit data terminal 114. Considering only the subroutine employed by the channel communications module 108, when word synchronization is obtained, at 1001, the 112 data bits of a channel data block are stored in a buffer and the bits corresponding to the radio channel state are checked for busy or idle information at 1003. After de-interleaving and convolutional decoding at 1005 the 16 bit check code for the 32 information bits, described previously in conjunction with FIG. 4, is compared with the proper check code at 1007 where an improper check code reverts the program to the subroutine beginning and a proper check code moves on to an address check at 1009. A received address is valid if it is assigned to an active remote unit in the communications system, or in the case of the remote data unit (which employs the same subroutine for data decoding) the validity check is made at the remote unit by comparing the received address with its individual preassigned address. If the received address is valid, the next 112 data bits are buffered, the channel state field is checked, and the data in de-interleaved and convolutionally decoded. Check code checks are again performed this time on the second block of 112 bits at 1011 and the control information from the second data block is stored at 1013. The data message itself is then sequentially accepted in 112 bit data blocks, de-interleaved, convolutionally decoded, and stored. When the last channel data block is detected as an end of message, at 1015, the data receive and decode loop is exited. The check code for all of the channel data blocks carrying data is compared at decision block 1017 since the check code for the last channel data block is used to carry the check code for all of the data blocks. An improper code check returns the program to the beginning of the subroutine; a proper code check results in the transmission of an acknowledge signal, at 1019, before returning to the main operating program. Further description of this type of message transmission and decoding may be found in U.S. patent application Ser. No. 512,800, "Method And Apparatus For Coding Messages Communicated Between A Primary Station And Remote Stations Of A Data Communication System" filed on behalf of Freeburg et al. on July 11, 1983 and assigned to the assignee of the present invention.

Figure 11:
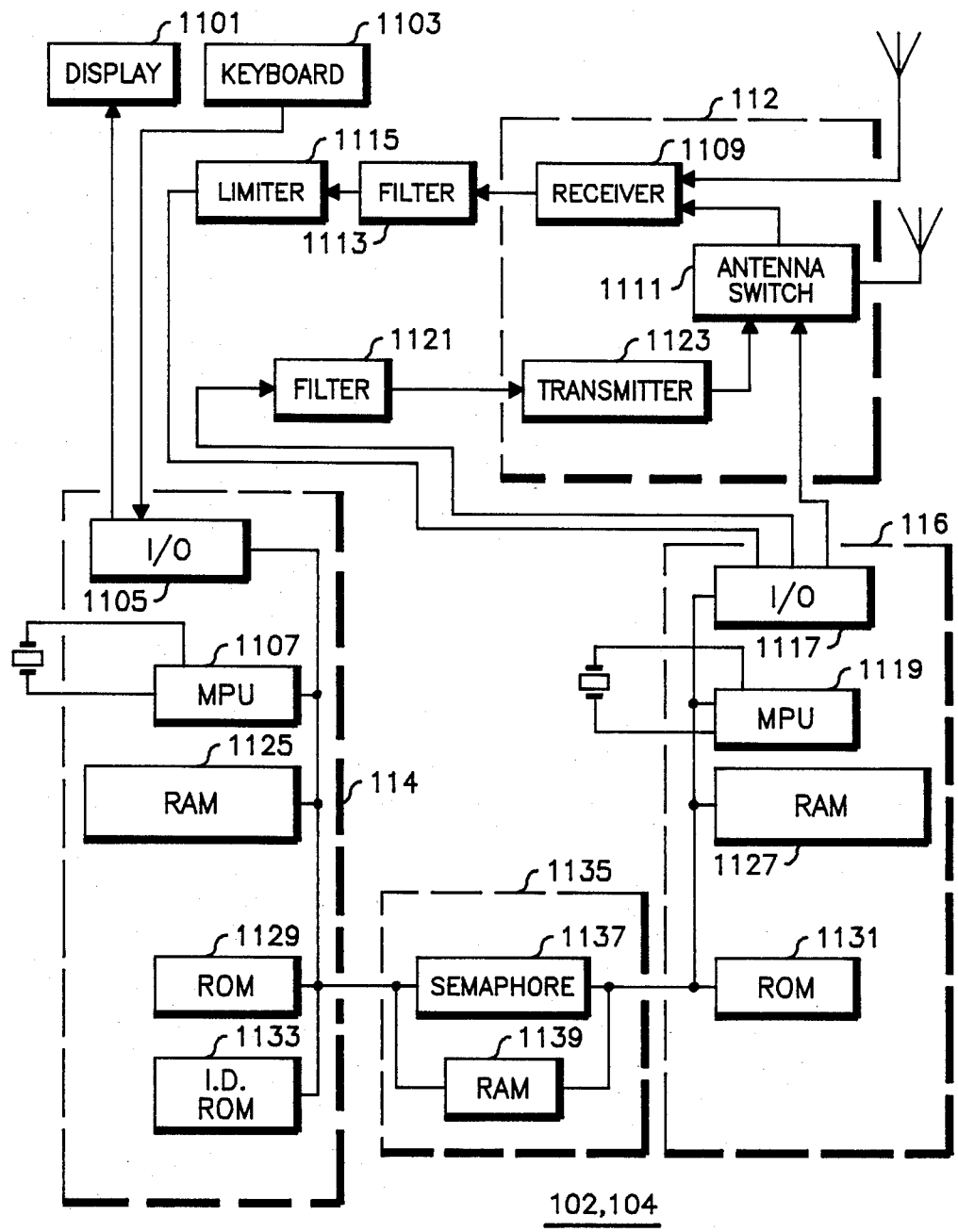
FIG. 11 is a block diagram of the control logic of a remote unit used in the system of the present invention.

A diagram of a typical interface circuit which may be found in a conventional remote unit is shown in FIG. 11. Each remote unit 102, 104, of the preferred embodiment includes a radio transceiver 112, an interface 116, a data terminal 114, and human interfaces: alphanumeric display 1101 and keyboard 1103. Alphanumeric display 1101 may be any commercially available display, such as an LCD display or gas discharge display, that provides for the display of one or more lines of alphanumeric information. Display 1101 is controlled by an I/O device 110, which adds and removes data from the bus of microprocessor 1107. Keyboard 1103 may be any commercially available keyboard having both numeric and alphanumeric keys. Keyboard 1103 is coupled to I/O device 1105 of microprocessor 1107, which senses activation of its various keys. Additional discussion may be found in U.S. patent application Ser. No. 603,399, "Improved Data Communications System Transmitter Selection Method and Apparatus" filed on behalf of Stuart Thro on Apr. 24, 1984 and assigned to the assignee of the present invention.

Radio transceiver 112 in FIG. 11 may be any suitable commercially available transceiver, such as that described in the aforementioned instruction manuals. Radio transceiver 112 includes two antennas spaced at a predetermined distance from one another for providing receiver diversity. The two antennas may also be located within the radio housing as shown and described in U.S. patent applications, Ser. No. 511,430, "Homotropic Antenna System", filed on behalf of Thomas F. Kneisel et al. on July 6, 1983, and Ser. No. 511,431, "Signal Quality Steered Diversity" filed on behalf of Eugene J. Bruckert et al., on July 6, 1983 and assigned to the assignee of the present invention. The receiver 1109 of transceiver 112 may be automatically coupled to one antenna or by an antenna switch 1111 to the other antenna as is appropriate for best reception. Antenna switch 1111 may be any suitable commercially available antenna switch, such as that described in aforementioned U.S. patent application Ser. No. 511,430. Receiver 1109 may include suitable commercially available circuits for selecting between the two antennas, such as, for example, the antenna selection circuitry in the aforementioned patent application Nos. 511,430 and 511,431 and in Motorola instruction manual No. 68P81039E25. Receiver 1109 demodulates message signals transmitted from the base station transmitters. The demodulated message signals are filtered by filter 1113 and limited by limiter 1115 and thereafter applied to the I/O device 1117 of an interface microprocessor microcomputer 1119. Message signals from I/O device 1117 of microprocessor 1119 are applied to filter 1121 and thereafter to transmitter 1123 for transmission to the fixed station 100. Transmitter 1123 is turned on in response to an activation signal from I/O device 1117. The output of transmitter 1123 is coupled to one of the radio transceiver antennas by way of antenna switch 1111.

The microprocessors of terminal 114 and interface 116 communicate via conventional bus structures with the I/O devices 1105 and 1117, random-access memory (RAM) 1125 and 1127, and read-only memory (ROM) 1129 and 1131, respectively. The terminal microprocessor 1107 also includes a removable I.D. ROM 1133 on its bus, which contains an address uniquely assigned to the remote unit. Microprocessors 1107 and 1119 may be any suitable commercially available microprocessor, such as, for example, the Motorola Type MC6800, MC6803, MC6805 or MC68000 microprocessors. Similarly, I/O device 1105 and 1117, RAM 1125 and 1127, ROM 1129 and 1131 and I.D. ROM 1133 may be any commercially available devices that are suitable for operation with the type of microprocessor selected. ROM's 1129 and 1131 store the control programs that are executed by microprocessors 1107 and 1119 respectively for communicating message signals and acknowledgement signals between the remote unit and the fixed station 100. RAM 1125 includes both a scratch pad area used by microprocessor 1107 during execution of the control program stored in ROM 1129 and a number of register locations allocated for storing the address or identification code of the remote unit read in by microprocessor 1107 from I.D. ROM 1133, information displayed by display 1101, information entered from keyboard 1103, and other status and control information. The contents of specific registers in RAM 1125 may be loaded or read-out by way of message signals received from the fixed station 100.

The microprocessor 1119 of the interface 116 receives messages by way of receiver 1109 and I/O device 1117 from the fixed station 100. The microprocessor 1119, in accordance with the stored program, demodulates, de-interleaves and decodes the information and data in each message and loads the data into a shared memory 1135, which includes a semaphore 1137 and RAM 1139. Access of RAM 1139 is controlled by semaphore 1137, which is shown and described in further detail in U.S. patent application, Ser. No. 480,777, "Semaphore For Memory Shared by Two Asynchronous Microcomputers", filed on behalf of John P. Byrns, on Apr. 22, 1983, and assigned to the assignee of the present invention. The terminal 114 then accesses the new information and data from shared memory 1135 and processes it. Information and data to be transmitted is formatted into information and data blocks as described in the aforementioned patent application Ser. Nos. 512,800 and 512,801, and loaded into shard memory by microprocessor 1107. The interface 116 microprocessor 1119 reads out the information and data blocks from shared memory 1135 and assembles the information and data blocks into messages formatted as shown in FIG. 3 and automatically transmits the messages to the fixed station.

Thus a system has been described which, by means of the present invention, enables a radio data communications system to recover and salvage a data message which would otherwise be lost due to interference. The sequential occurrence of a radio signal strength increase and a detection of a synchronization sequence of data bits within a predetermined time period causes the fixed site to discard the message of a previously transmitting weaker remote unit and to synchronize and process the message of an interfering stronger remote unit.

While a particular embodiment of the present invention has been shown and described, it should be understood that the invention is not limited thereto, for modifications of form may be created by those skilled in the art without departing from the true spirit and scope of the basic underlying principles of the present invention. It is therefore contemplated to cover by the present application any and all such modifications to the present invention disclosed and claimed herein.

We claim:

1. A data communications system carrying messages preceded by a predetermined synchronization sequence of a plurality of data bits on a radio channel between a plurality of remote data units and at least one fixed station, comprising:
   first means for detecting a change in radio signal level of at least a predetermined magnitude during a first message on the radio channel;
   second means, responsive to detection of said change in radio signal level, for detecting the predetermined synchronization sequence of a second message;
   means for timing the operation of said second means for detecting and for deactivating said second detection means after said timing means times out, thereby creating a detection window; and means, responsive to detection of the predetermined synchronization sequence of said second message, for processing said second message instead of said first message.

2. A data communications system in accordance with claim 1, wherein said communications system further comprises means for detecting the predetermined synchronization sequence preceding said first message.

3. A data communications system in accordance with claim 2, wherein said communications system further comprises means for processing said first message after detection of the predetermined synchronization sequence.

4. A data communications system in accordance with claim 2, wherein said communications system further comprises means for deactivating said means for detecting the predetermined synchronization sequence preceding said first message in response to the detection of said first message predetermined synchronization sequence.

5. A data communications system in accordance with claim 1, wherein said communications system further comprises means for detecting a first radio signal level associated with said first message.

6. A data communications system in accordance with claim 5, wherein said means for detecting a first radio signal level associated with said first message further comprises means for storing said first radio signal level.

7. A data communications system in accordance with claim 6, wherein said means for processing said second message instead of said first message further comprises means for clearing said means for storing said first radio signal level.

8. A data communications system in accordance with claim 5, wherein said means for detecting said first radio signal level further comprises means for sampling said first radio signal at different times to obtain a plurality of radio signal levels.

9. A data communications system in accordance with claim 8, wherein said means for detecting said first radio signal level further comprises means for averaging said plurality of radio signal levels.

10. A data communications system in accordance with claim 1, wherein said second means for detecting further comprises means for delaying detection of the second message predetermined synchronization sequence for a predetermined period of time.

11. A data communications system carrying messages preceded by a predetermined synchronization sequence of a plurality of data bits on a radio channel between a plurality of remote data units and at least one fixed station, comprising:
    means for detecting the synchronization sequence preceding the message of a first remote data unit and for processing the message of said first remote unit after detection of the synchronization sequence;
    means for detecting a first radio signal level associated with said first remote data unit message;
    means for detecting a second radio signal level greater by a predetermined value than that detected by said first signal level detector, said second radio signal level associated with a second remote data unit commencing a message during and interfering with said first remote data unit message;
    means for detecting the synchronization sequence preceeding the message of said second remote data unit if said second signal level detection occurs;
    means for timing the operation of said second remote data unit message synchronization detection means and for deactivating said second remote data unit message synchronization detection means after said timing means times out, thereby creating a detection window; and
    means for causing preferential processing of the message of said second remote data unit in place of the message of said first remote data unit if said second remote data unit synchronization sequence has been detected.

12. A data communications system in accordance with claim 11, wherein said means for detecting a first radio signal level associated with said first remote data unit message further comprises means for storing said first radio signal level.

13. A data communications system in accordance with claim 12, wherein said means for causing preferential processing of said second remote data unit message further comprises means for clearing said means for storing said first radio signal level.

14. A data communications system in accordance with claim 11, wherein said means for detecting said first radio signal level further comprises means for sampling said first radio signal at different times to obtain a plurality of radio signal levels.

15. A data communications system in accordance with claim 14, wherein said means for detecting said first radio signal level further comprises means for averaging said plurality of radio signal levels.

16. A data communications system in accordance with claim 11, wherein said communications system further comprises means for deactivating said means for detecting the synchronization sequence preceding the message of said first remote data unit in response to the detection of said first remote data unit synchronization sequence.

17. A data communications system in accordance with claim 11, wherein said communications system further comprises means, responsive to said means for detecting a second radio signal level, for delaying said means for timing said second remote data unit message synchronization sequence detector for a predetermined period of time.

18. A fixed station controller for a data communications system carrying messages preceded by a predetermined synchronization sequence of a plurality of data bits on a radio channel between a plurality of remote data units and at least one fixed station, comprising:
 means for detecting the synchronization sequence preceding the message of a first remote data unit and for entering a dormant state upon the synchronization sequence detection;
 means for detecting and storing a first radio signal level associated with said first remote data unit message;
 means for processing the message of said first remote data unit after detection of the synchronization sequence;
 means for detecting a second radio signal level and for comparing said second radio signal level to said stored first radio signal level, said second radio signal level associated with a second remote data unit commencing a message during and interfering with said first remote data unit message;
 means for generating a synchronization sequence detector reactivation signal if said comparison means discovers said second radio signal level exceeds said stored first radio signal level by a predetermined amount, thereby enabling the detection of the synchronization sequence preceding the message of said second remote data unit;
 means for deactivating said synchronization sequence detector a predetermined period of time after said reactivation signal; and
 means for causing preferential processing of the message of said second remote data unit in place of the message of said first remote data unit if said reactivated synchronization sequence detector detects a synchronization sequence.

19. A fixed station controller in accordance with claim 18, wherein said means for causing preferential processing of the message of said second remote data unit message further comprises means for clearing said means for storing said first radio signal level.

20. A fixed station controller in accordance with claim 18, wherein said means for detecting and storing said first radio signal level further comprises means for sampling said first radio signal at different times to obtain a plurality of radio signal levels.

21. A fixed station controller in accordance with claim 20, wherein said means for detecting and storing said first radio signal level further comprises means for averaging said plurality of radio signal levels.

22. A fixed station controller in accordance with claim 18, wherein said fixed station controller further comprises means, responsive to said means for detecting a second radio signal level, for delaying said means for generating a synchronization sequence detector reactivation signal for a predetermined period of time.

23. A method of capturing messages for a data communications system carrying messages preceded by a predetermined synchronization sequence of a plurality of data bits on a radio channel between a plurality of remote data units and at least one fixed station, comprising the steps of:
 detecting a change in radio signal level of at least a predetermined magnitude during a first message on the radio channel;
 detecting the predetermined synchronization sequence of a second message in response to said detection of said change in radio signal level;
 timing the duration of said second message predetermined synchronization sequence detection;
 deactivating said sequence detector after said timing step, thereby creating a detection window; and
 processing said second message instead of said first message in response to said detection of the predetermined synchronization sequence of said second message.

24. A method in accordance with the method of claim 23 further comprising the step of detecting the predetermined synchronization sequence preceding said first message.

25. A method in accordance with the method of claim 24 further comprising the step of processing the message of said first message after detection of the predetermined synchronization sequence.

26. A method in accordance with the method of claim 24 further comprising the step of ignoring, in response to the detection of said first message predetermined synchronization sequence, any additional sychronization sequences which may occur.

27. A method in accordance with the method of claim 23 further comprising the step of detecting a first radio signal level associated with said first message.

28. A method in accordance with the method of claim 27 further comprising the step of storing said detected first radio signal level.

29. A method in accordance with the method of claim 28 further comprising the step of removing said detected first radio signal level from storage in response to said detection of the predetermined synchronization sequence of said second message.

30. A method in accordance with the method of claim 27 wherein the step of detecting said first radio signal level further comprises the step of sampling said first radio signal at different times to obtain a plurality of radio signal levels.

31. A method in accordance with the method of claim 30 wherein the step of detecting said first radio signal level further comprises the step of averaging said plurality of radio signal levels.

32. A method in accordance with the method of claim 23 further comprising the step of delaying detection of said second message predetermined synchronization sequence for a predetermined period of time.

33. A method of capturing messages for a data communications system carrying messages preceded by a predetermined synchronization sequence of a plurality of data bits on a radio channel between a plurality of remote data units and at least one fixed station, comprising the steps of:
  detecting the synchronization sequence preceding the message of a first remote data unit after detection of the synchronization sequence;
  detecting a first radio signal level associated with said first remote data unit message;
  detecting a second radio signal level greater by a predetermined value than that detected for said first radio signal level, said second radio signal level associated with a second remote data unit commencing a message during and interfering with said first remote data unit message;
  detecting the synchronization sequence preceding the message of said second remote data unit if said signal level detection occurs;
  timing said step of detecting said second remote data unit message synchronization sequence and deactivating said second remote data unit synchronization sequence detecting step after said timing step, thereby creating a detection window; and
  causing preferential processing of the message of said second remote data unit in place of the message of said first remote data unit if said second remote data unit synchronization sequence detection has occurred.

34. A method in accordance with the method of claim 33 further comprising the step of storing said detected first radio signal level.

35. A method in accordance with the method of claim 34 further comprising the step of clearing said first radio signal level from said storage in response to the causing of preferential processing of the message of said second remote data unit.

36. A method in accordance with the method of claim 33 wherein the step of detecting said first radio signal level further comprises the step of sampling said first radio signal at separate times to obtain a plurality of radio signal levels.

37. A method in accordance with the method of claim 36, wherein the step of detecting said first radio signal level further comprises the step of averaging said plurality of radio signal levels.

38. A method in accordance with the method of claim 33 further comprising the step of ignoring, in response to the detection of said first remote data unit synchronization sequence, additional synchronization sequences which may occur.

39. A method in accordance with the method of claim 33 further comprising the step of delaying said timing step for a predetermined period of time in response to said detection of a second radio signal level.

40. A method for a fixed station controller used in a data communications system carrying messages preceded by a predetermined synchronization sequence of a plurality of data bits on a radio channel between a plurality of remote data units and at least one fixed station, comprising the steps of:
  detecting the synchronization sequence preceding the message of a first remote data unit and entering a dormant state of no detection upon said synchronization sequence detection;
  detecting and storing a first radio signal level associated with said first remote data unit message;
  processing the message of said first remote data unit after detection of the synchronization sequence;
  detecting a second radio signal level and comparing said second radio signal level to said stored first radio signal level, said second radio signal level associated with a second remote data unit commencing a message during and interfering with said first remote data unit message;
  generating a reactivation signal such that the synchronization sequence may again be detected if said comparing step reveals that said second radio signal level exceeds said stored first radio signal level by a predetermined amount, thereby enabling the detection of the synchronization sequence preceding the message of said second remote data unit;
  deactivating said synchronization sequence detection a predetermined period of time after said reactivation signal generation; and
  causing preferential processing of the message of said second remote data unit in place of the message of said first remote data unit if the synchronization sequence of said second remote data unit has been detected.

41. A method in accordance with the method of claim 40 wherein the step of causing preferential processing of the message of said second remote data unit message further comprises the step of clearing said first radio signal level from storage.

42. A method in accordance with the method of claim 40 wherein the step of detecting and storing a first radio signal level further comprises the step of sampling said first radio signal at different times to obtain a plurality of radio signal levels.

43. A method in accordance with the method of claim 42 wherein the step of detecting and storing a first radio signal level further comprises the step of averaging said plurality of radio signal levels.

44. A method in accordance with the method of claim 42 further comprising the step of delaying said step of generating said reactivation signal for a predetermined period of time in response to said detection of said second radio signal level.

* * * * *

UNITED STATES PATENT AND TRADEMARK OFFICE
CERTIFICATE OF CORRECTION

PATENT NO. : 4,611,334

DATED : September 9, 1986

INVENTOR(S) : James R. Engel et al.

It is certified that error appears in the above-identified patent and that said Letters Patent is hereby corrected as shown below:

Column 16, Claim 44, line 57, "42" should read -- 40 --.

Signed and Sealed this

Sixth Day of January, 1987

Attest:

DONALD J. QUIGG

Attesting Officer

Commissioner of Patents and Trademarks